(12) United States Patent
Therrien

(10) Patent No.: US 8,636,437 B2
(45) Date of Patent: Jan. 28, 2014

(54) CONNECTING CORNER FOR SCREENS

(76) Inventor: Gerard Therrien, St-Apollinaire (CA)

( * ) Notice: Subject to any disclaimer, the term of this patent is extended or adjusted under 35 U.S.C. 154(b) by 998 days.

(21) Appl. No.: 12/008,576

(22) Filed: Jan. 11, 2008

(65) Prior Publication Data

US 2008/0219759 A1  Sep. 11, 2008

(30) Foreign Application Priority Data

Jan. 12, 2007 (CA) ...................... 2573823

(51) Int. Cl.
 *F16B 7/00* (2006.01)
(52) U.S. Cl.
 USPC ......................................... 403/205; 403/403
(58) Field of Classification Search
 USPC ......... 403/205, 231, 253, 381, 401, 402, 403;
  49/425, 504; 160/381
 See application file for complete search history.

(56) References Cited

U.S. PATENT DOCUMENTS

| | | | | |
|---|---|---|---|---|
| 4,076,438 A * | 2/1978 | Bos | ............................... | 403/402 |
| 4,087,941 A * | 5/1978 | Wolfe | ........................... | 403/402 |
| 5,433,054 A * | 7/1995 | Langenhorst | ................. | 403/402 |
| 6,644,380 B2 * | 11/2003 | Perich et al. | .................... | 49/425 |
| 6,672,365 B2 * | 1/2004 | Therrien | ........................ | 160/381 |
| 2006/0059843 A1* | 3/2006 | Leontaridis | .................. | 52/656.1 |
| 2007/0297854 A1* | 12/2007 | Ohrstrom | ...................... | 403/401 |

* cited by examiner

*Primary Examiner* — Michael P Ferguson
(74) *Attorney, Agent, or Firm* — Eric Fincham

(57) ABSTRACT

A corner member for a window screen for joining framing members together at the corners, the corner member having a central body, first and second legs extending outwardly therefrom, a recess formed in the central body portion, and a plurality of resilient retaining members placed in the recess, each resilient retaining member having first and second retaining tabs which extend outwardly and which are designed to retain the screen in the window frame.

12 Claims, 5 Drawing Sheets

US 8,636,437 B2

CONNECTING CORNER FOR SCREENS

FIELD OF THE INVENTION

The present invention relates to screens such as are used in a building structure and more particularly, relates to a corner member used in the manufacture or assembly of screens.

BACKGROUND OF THE INVENTION

In modern day windows, a screen is usually provided as part of original window equipment. The screen member must be light-weight and easily removable such that access may be had to the glass portion of the window. Traditionally, the screen is formed by a top frame member, a bottom frame member, and two side frame members. The frame members are secured together at the corners by suitable means. In some windows, a corner member is used to join the frame members.

The advantage of forming the screens from the frame members and joining at their corners is the ease with which different size screens may be formed. As there are no standards for window size, the screens have to be custom designed for each window.

The screen is frequently held in place by means of metallic springs which sit in channels formed in the window. The springs on one side of the screen push the screen into an opposing channel. Alternatively, a pin like element may be provided in the sides of the screen with the pins being movable to sit within an aperture formed in the window frame.

While both of the above methods function satisfactorily, they do require certain manufacturing adjustments and, in the case of the pin like elements, can be somewhat costly to manufacture.

SUMMARY OF THE INVENTION

It is an object of the present invention to provide a corner member for fabricating screens and which corner member also includes means for securing the screen in place.

As used herein, the term "window screen" includes those screen members which may be utilized for other purposes such as in doors or the like.

According to one aspect of the present invention, there is provided a corner for a window screen comprising a central body portion, first and second legs extending outwardly from the central body portion, the first and second legs having longitudinal axes which are mutually perpendicular with respect to each other, a recess formed in the central body portion, and a resilient retaining member in the recess, the resilient retaining member having first and second retaining tabs, the first retaining tab extending outwardly in a perpendicular direction with respect to the first leg, the second retaining member extending outwardly in a perpendicular direction with respect to the second leg.

According to a further aspect of the present invention, there is provided a window screen, the window screen comprising a top frame member, a bottom frame member, and a pair of side frame members, the frame members being secured at corners thereof by a corner member, the corner member comprising a central body portion, first and second legs extending outwardly from the central body portion, the first and second legs having longitudinal axes which are mutually perpendicular with respect to each other, a recess formed in the central body portion, and a resilient retaining member in the recess, the resilient retaining member having first and second retaining tabs, the first retaining tab extending outwardly in a perpendicular direction with respect to the first leg, the second retaining member extending outwardly in a perpendicular direction with respect to the second leg.

The frame members used for the construction of the screen may be any suitable, each generally having an elongated body portion with an opening extending therethrough. The frame members will receive screening therein, conventionally by means of a resilient element as is well known in the art.

The corner members of the present invention may be formed of any suitable material—i.e. a plastic or metallic material. Preferably, they are formed of an injection molded plastic material.

The retaining tabs are preferably formed of an elastomeric material to have suitable resiliency. It is these members which are designed to fit within a recess in the window to retain the screen in position.

BRIEF DESCRIPTION OF THE DRAWINGS

Having thus generally described the invention, reference will be made to the accompanying drawings illustrating an embodiment thereof, in which.

DETAILED DESCRIPTION OF THE INVENTION

Figure 1:
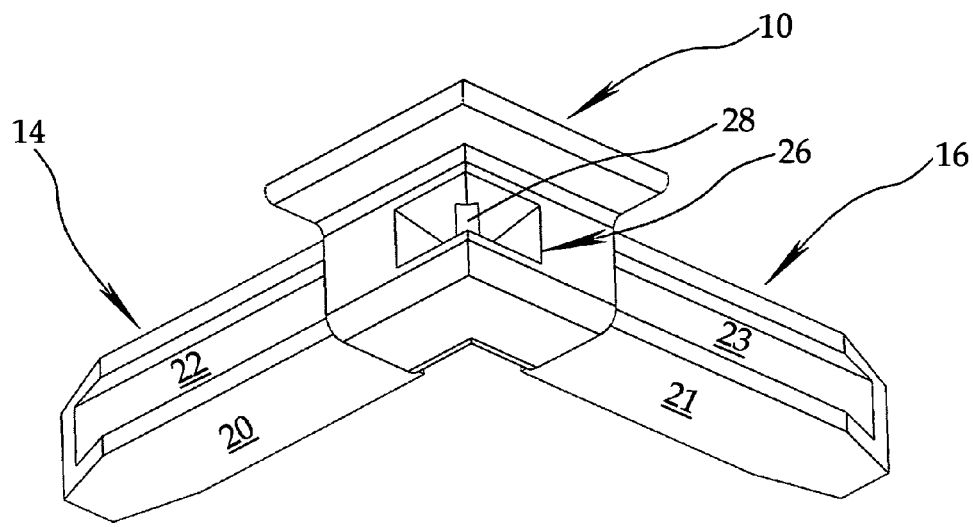
FIG. 1 is a bottom perspective view of a screen corner according to one embodiment of the present invention, the resilient retaining member being removed.

Having thus generally described the invention, reference will be made to the accompanying drawings illustrating an embodiment thereof, in which there is provided a screen corner which is generally designated by reference numeral 10.

Screen corner 10 includes a central body portion 12. Extending outwardly from central body portion 12 is a first leg 14 and a second leg 16. Legs 14 and 16 have mutually perpendicular longitudinal axes.

Leg 14 has a top wall 18, a bottom wall 20, and a side wall 22 with ribs 24 extending between top wall 18 and bottom wall 20. It will be noted that there is no side wall on the side opposite side wall 22. Furthermore, it will be noted that top wall 18 slopes downwardly from side wall 22.

Similarly, leg 16 includes a top wall 19, a bottom wall 21 and a side wall 23. Ribs 25 are formed between top wall 19 and bottom wall 21.

A recess 26 is formed in central body portion 12 as may be seen in FIG. 1. Within recess 26, there is provided a diagonal rib 28 which extends outwardly for a portion of the recess 26.

Central body portion 12 has a top wall which is comprised of two segments 32 and 34. As may be seen in FIG. 2, segments 32 and 34 slope downwardly to correspond to the slope of adjacent leg top walls 18, 19.

A flange extends outwardly from segments 32, 34 and is comprised of a first flange section 36 and a second flange section 38.

Figure 2:
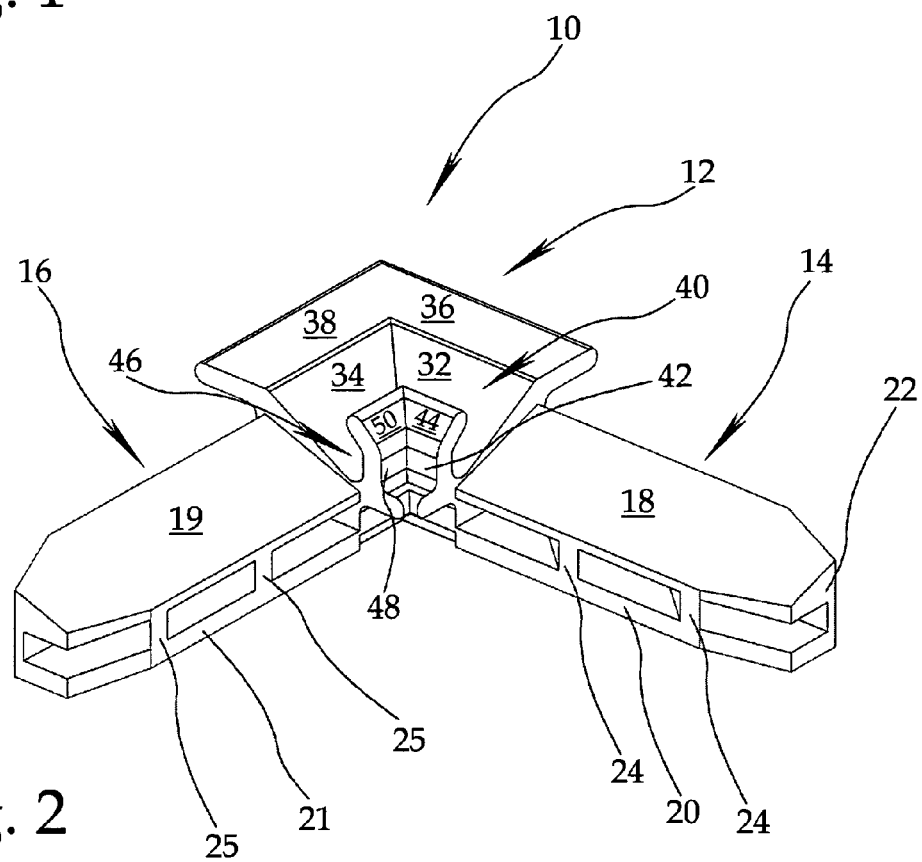
FIG. 2 is a top perspective view thereof.
Figure 3:
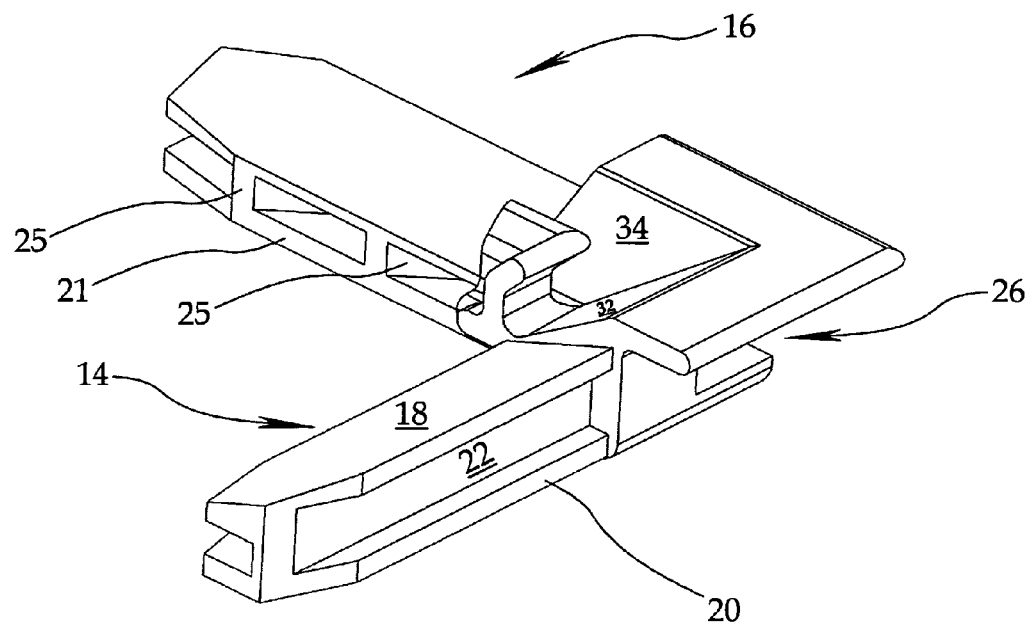
FIG. 3 is a further perspective view thereof.

As may be best seen in FIGS. 2 and 3, there is provided a first inner wall 40 which extends upwardly from segment 32.

Inner wall 40 is comprised of a straight section 42 and an angled section 44. Similarly, from segment 34 there is a second inner wall 46 which likewise has a straight section 48 and an angled section 50.

Figure 4:
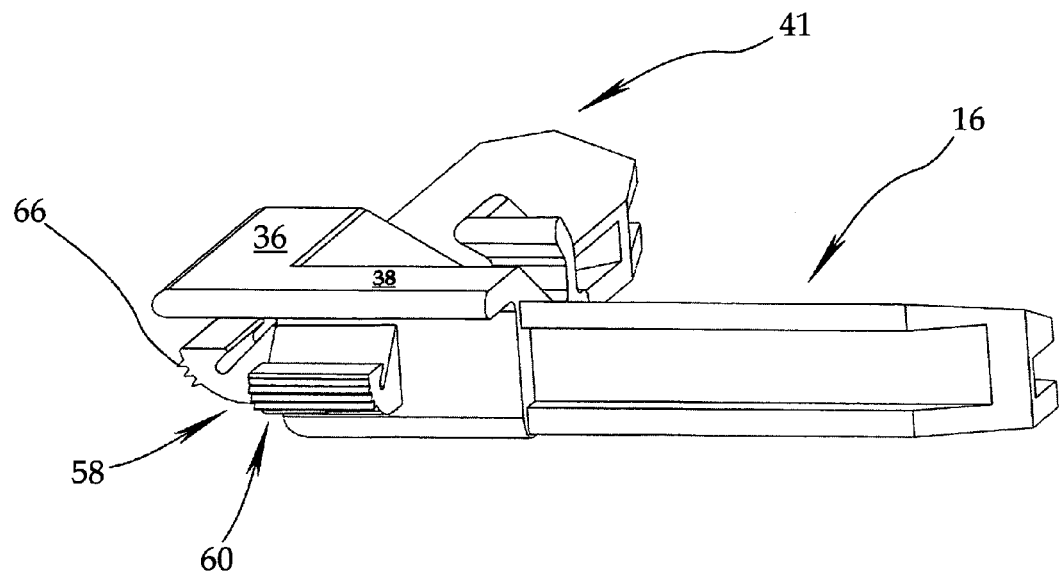
FIG. 4 is a perspective view of the screen corner having the resilient retaining member.
Figure 5:
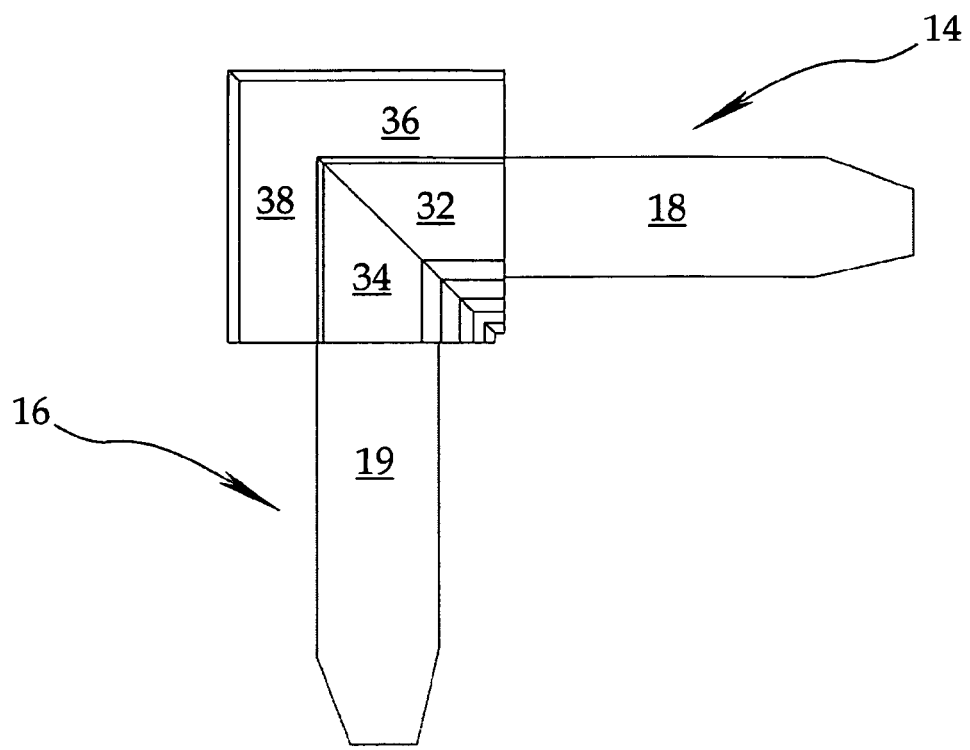
FIG. 5 is a top plan view thereof.
Figure 6:
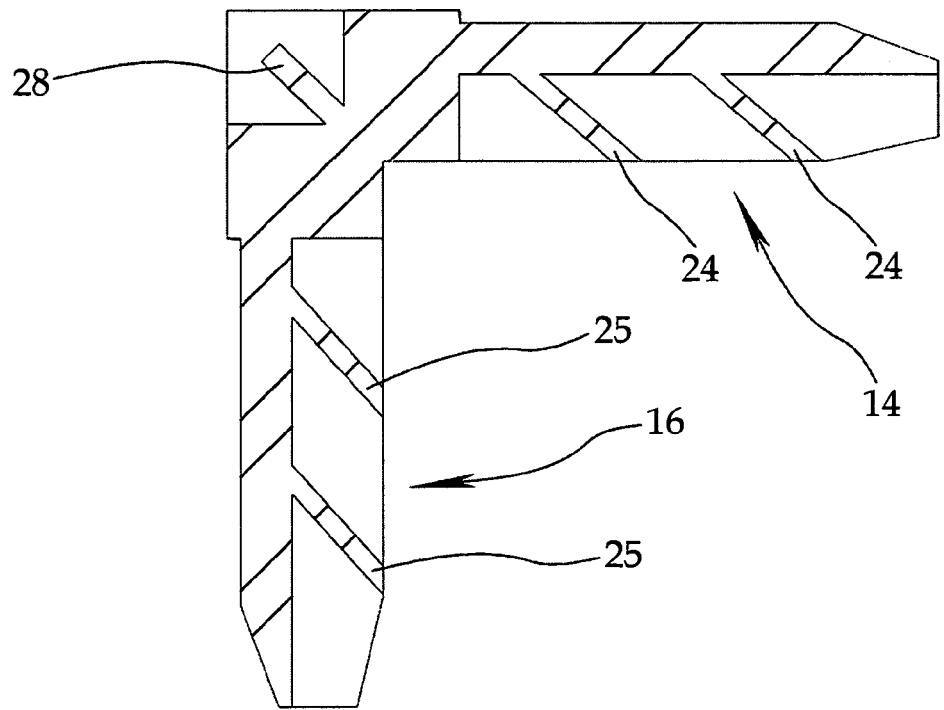
FIG. 6 is a sectional view thereof.

Recess 26 is designed to receive a resilient retaining member generally designated by reference numeral 52 and which is illustrated in position in FIG. 4.

Figure 7:
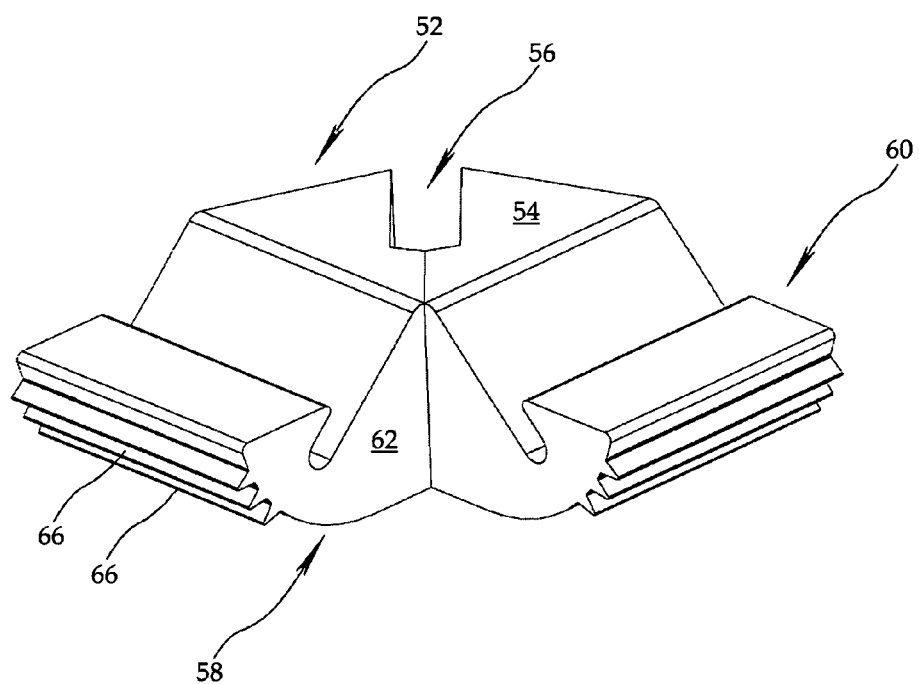
FIG. 7 is a perspective view of the flexible retaining member utilized with the screen corner.
Figure 8:
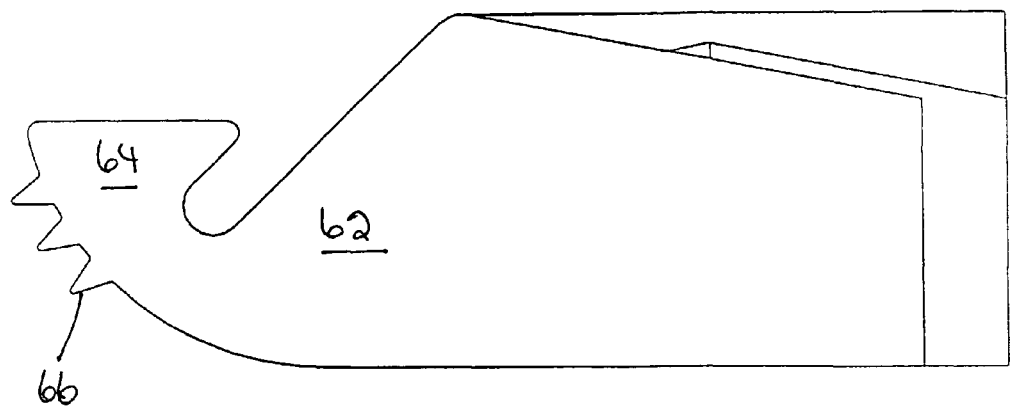
FIG. 8 is a detailed view of a portion of the flexible retaining member illustrating one of the retaining tabs.
Figure 9:
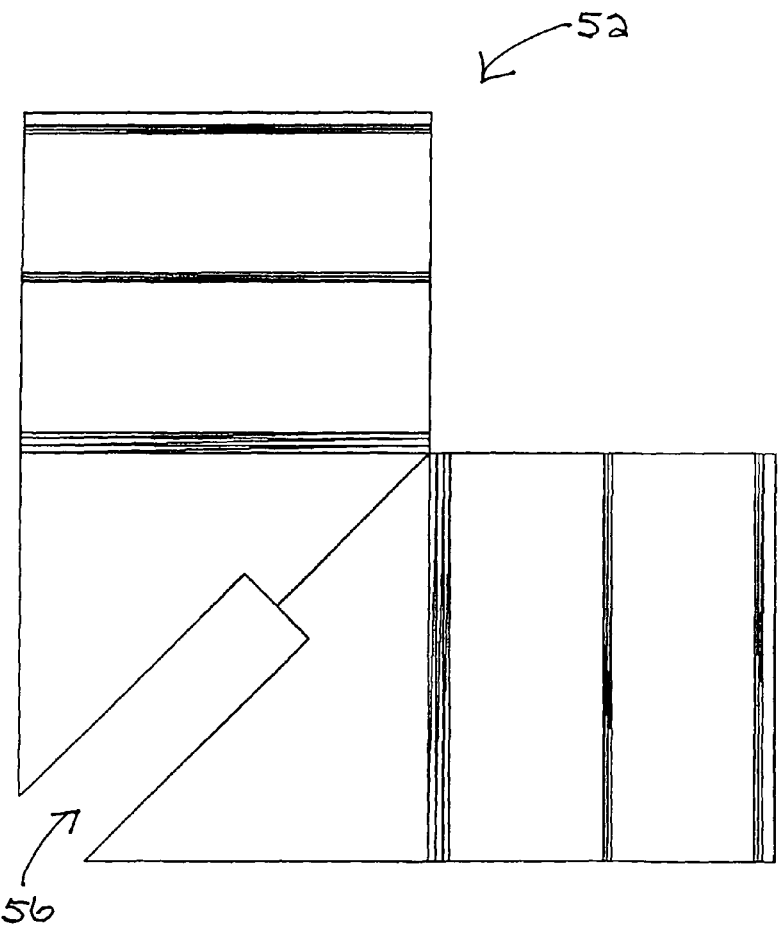
FIG. 9 is a top plan view of the flexible retaining member.

As may be best seen in FIG. 7, resilient retaining member 52 includes a main body portion 54 which is of a substantially rectangular configuration. A diagonally extending slot 56 is formed therein and is designed to receive diagonal rib 28 for purposes of positioning and retaining resilient retaining member 52.

Resilient retaining member 52 includes a pair of retaining tabs 58 and 60 which are designed to project outwardly of recess 26 and which underlie flange sections 36 and 38. Retaining tabs 58 and 60 are substantially identical and thus, only one will be described in detail herein.

Retaining tab 58 includes a somewhat triangularly shaped portion 62 which, at its apex, merges with a flange 64. A plurality of triangularly shaped ribs 66 extend outwardly therefrom.

The retaining tabs 58, 60 are designed to fit within a recess in the window in a conventional manner.

It will be understood that the above described embodiment is for purposes of illustration only and that changes and modifications may be made thereto without departing from the spirit and scope of the invention.

I claim:

1. A corner member for use with hollow frame members to form a window screen comprising:
    a central body portion;
    first and second legs extending outwardly from said central body portion, said first and second legs having longitudinal axes which are mutually perpendicular with respect to each other, said legs each being sized to enter one of said frame members, said central body portion being sized larger than said legs to prevent entry thereof into said frame members;
    a recess formed in said central body portion; and
    a resilient retaining member in said recess, said resilient retaining member having first and second retaining tabs, said first retaining tab extending outwardly beyond said central body portion in a perpendicular direction with respect to said first leg, said second retaining tab extending outwardly beyond said central body portion in a perpendicular direction with respect to said second leg.

2. The corner member of claim 1 wherein each of said legs has an upper wall, a bottom wall, and a side wall, said upper wall sloping inwardly and downwardly with respect to said lower wall.

3. The corner member of claim 2 further including a plurality of ribs extending between said upper wall and said lower wall.

4. The corner member of claim 1 wherein said central body portion has an upper wall and a lower wall, a flange extending outwardly from said upper wall on sides thereof to overlie said first and second retaining tabs.

5. The corner member of claim 4 further including a diagonally extending rib extending between said upper wall and said lower wall within said recess.

6. The corner member of claim 1 wherein each of said retaining tabs comprises an initial triangularly shaped portion extending outwardly from said resilient retaining member, and a retaining tab flange extending upwardly from an apex of said triangularly shaped portion.

7. The corner member of claim 6 further including a plurality of flexible ribs extending outwardly from each of said retaining tab flanges.

8. The corner member of claim 7 wherein said ribs each have a triangular configuration.

9. The corner member of claim 2 wherein said central body portion has a top wall, said top wall having first and second segments, each of said first and second segments sloping inwardly and downwardly corresponding to said upper wall of an adjacent leg.

10. A window screen comprising:
    a top frame member;
    a bottom frame member;
    a pair of side frame members, said frame members being hollow and being secured at corners thereof by a corner member, said corner member comprising a central body portion;
    first and second legs extending outwardly from said central body portion, said first and second legs having longitudinal axes which are mutually perpendicular with respect to each other, said legs extending interiorly of said frame member with said central body portion being exterior of said frame members;
    a recess formed in the central body portion; and
    a resilient retaining member in the recess, said resilient retaining member having first and second retaining tabs, said first retaining tab extending outwardly in a perpendicular direction with respect to the first leg, said second retaining member tab extending outwardly in a perpendicular direction with respect to said second leg, each of said retaining tabs extending beyond said central body portion to permit engagement with a window frame.

11. The corner member of claim 1 wherein said resilient retaining member is formed of an elastomeric material.

12. The window screen of claim 10 wherein said resilient retaining member is an elastomeric material.

* * * * *